May 20, 1941.  C. D. PETERSON ET AL  2,242,542
HYDRAULIC GEAR SHIFTING MECHANISM
Filed Oct. 5, 1938  5 Sheets-Sheet 1
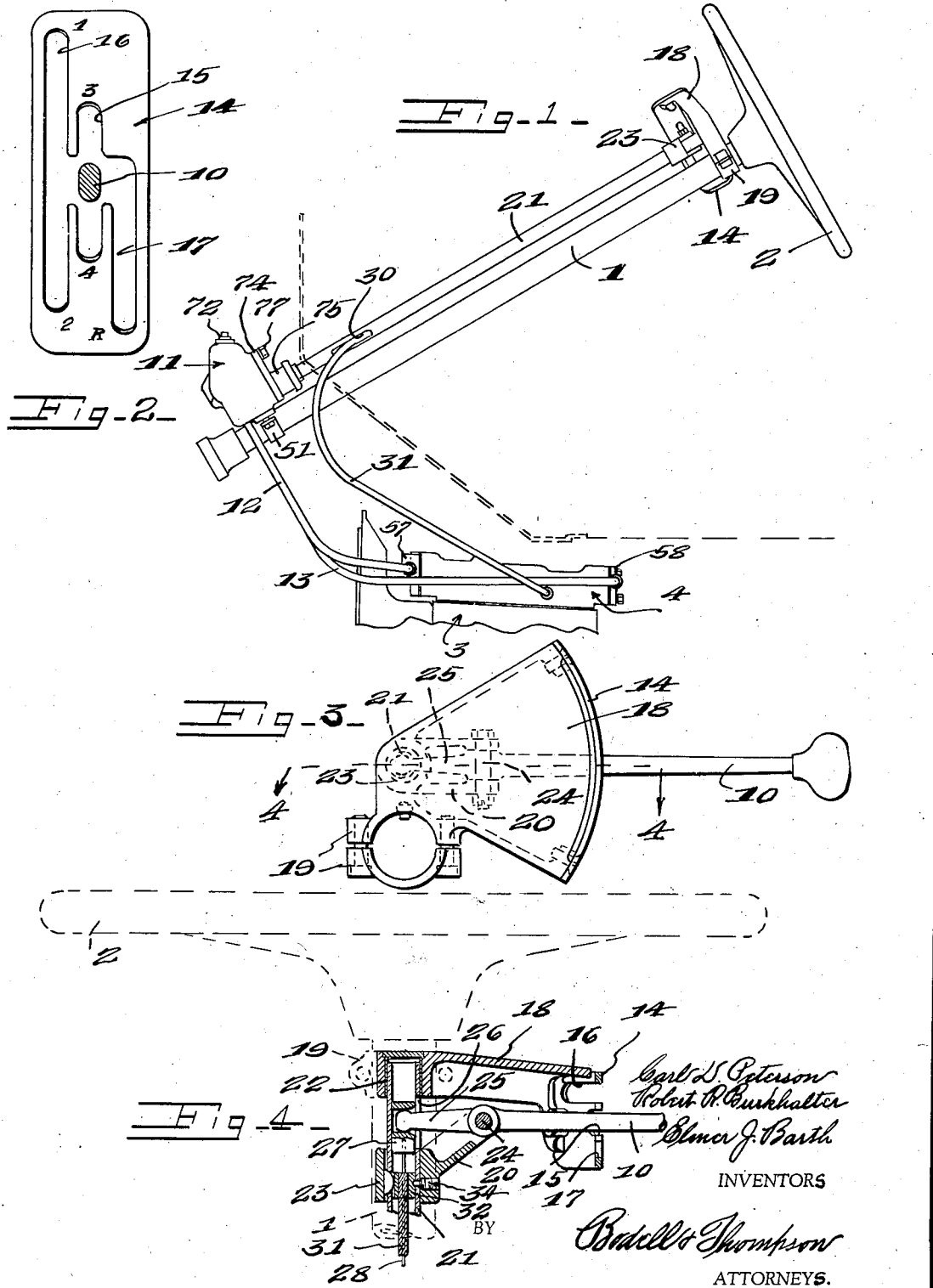

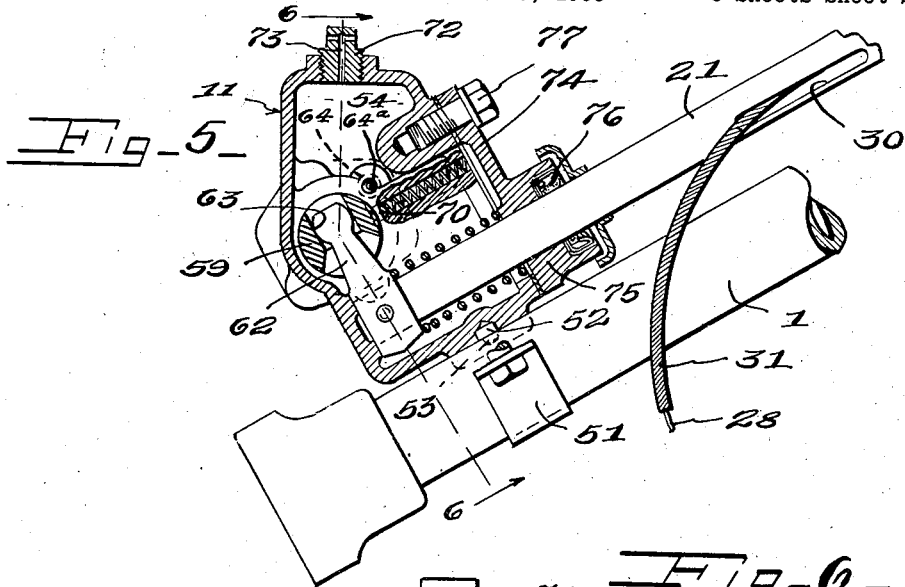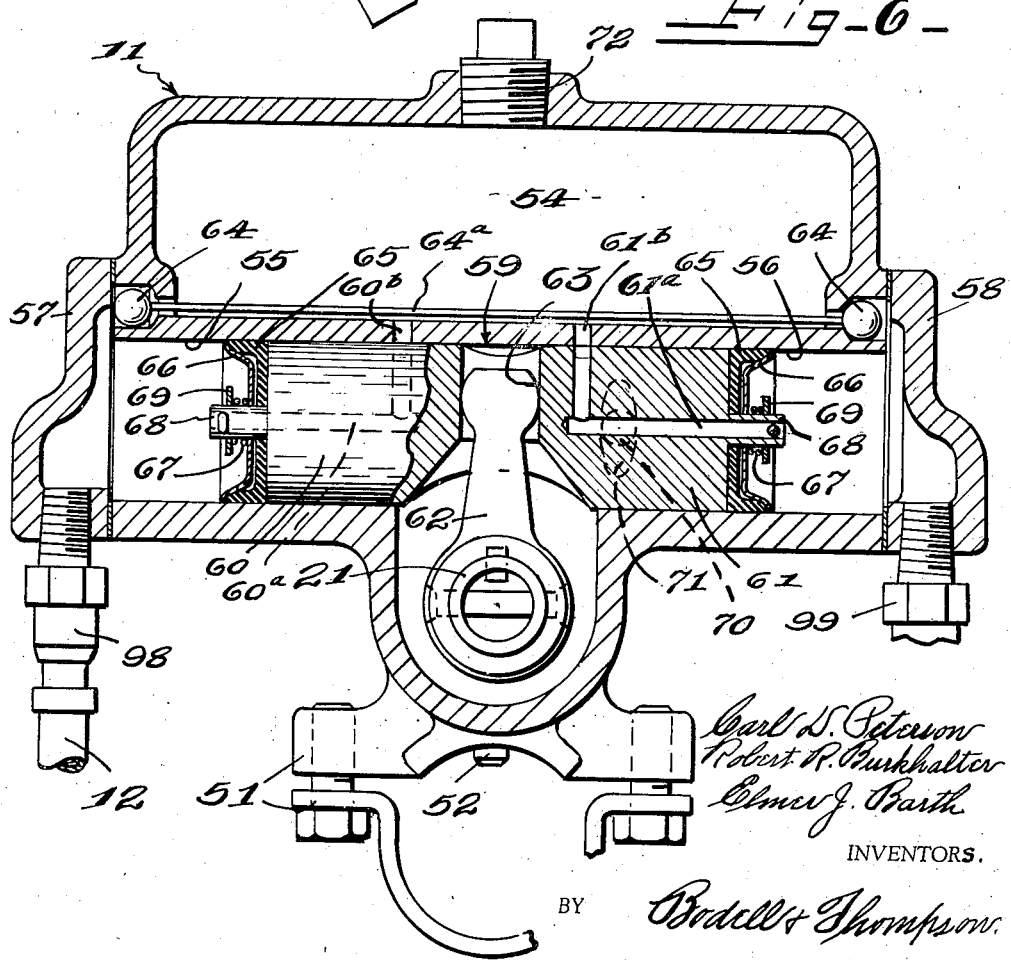

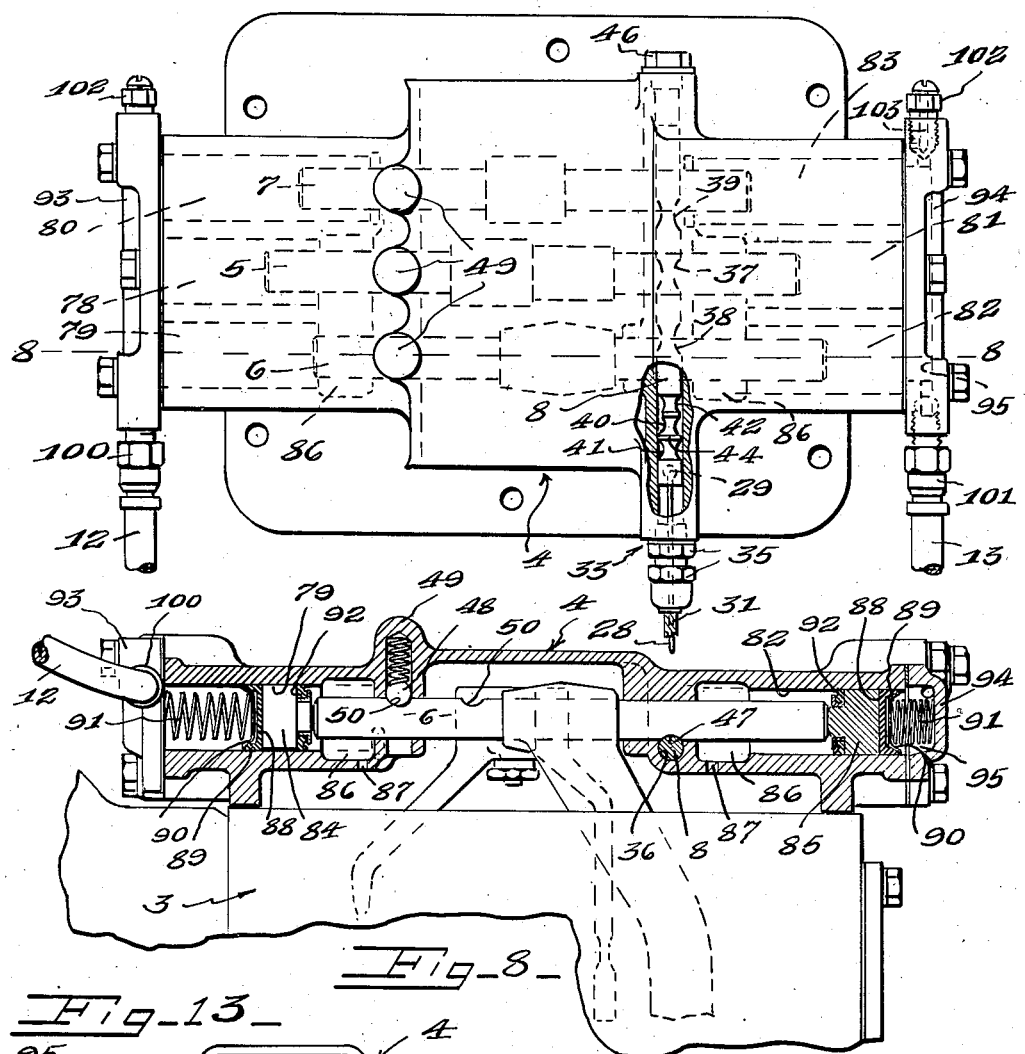

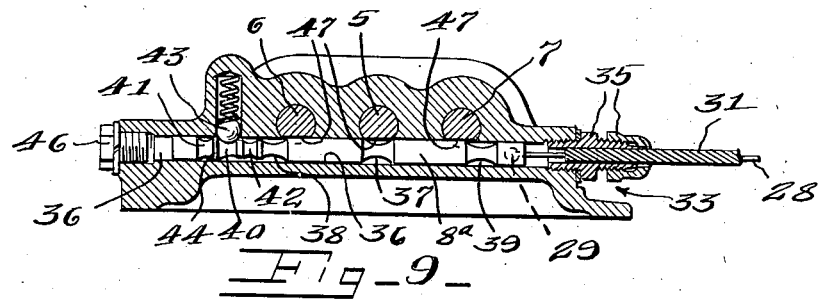

May 20, 1941.   C. D. PETERSON ET AL   2,242,542
HYDRAULIC GEAR SHIFTING MECHANISM
Filed Oct. 5, 1938   5 Sheets-Sheet 5

Carl D. Peterson
Robert R. Burkhalter
Elmer J. Barth
INVENTORS

BY Bodell & Thompson
ATTORNEYS

Patented May 20, 1941

2,242,542

UNITED STATES PATENT OFFICE 2,242,542

HYDRAULIC GEAR SHIFTING MECHANISM

Carl D. Peterson, Robert R. Burkhalter and Elmer J. Barth, Toledo, Ohio, assignors to Spicer Manufacturing Corporation, Toledo, Ohio, a corporation of Virginia Application October 5, 1938, Serial No. 233,440

3 Claims. (Cl. 74—346)

This invention relates to remote control gear shifting mechanism for selective change-speed transmission gearings, such as are used in motor vehicles, and has for its general object a simple and compact mechanism by which the shifts in the transmission gearing are effected by fluid displacement controlled by a shifting lever remote from the transmission gearing, as on the steering column of the vehicle, or in any other location convenient to the driver.

More specifically, it has for its object such a shifting mechanism in which the shift to be made is effected by a selecting movement of the operating or hand lever and the shifting effected through hydraulic mechanism or by fluid displacement by the fore-and-aft movement of the operating or hand lever.

It also has for its object a reversely movable pump mechanism for pumping a hydraulic liquid to pressure-operated devices associated with the transmission gearing to shift the shiftable parts thereof, the pump being actuated in one direction or the other, when the fore-and-aft movement of the operating or hand lever is effected.

It further has for its object a gear shifting mechanism which can be readily applied to either a right or left hand driven or steered vehicle and in either case arranged to be operated by the right or left hand of the driver.

Other objects will appear throughout the specification.

The invention consists in the novel features and in the combinations and constructions hereinafter set forth and claimed.

In describing this invention, reference is had to the accompanying drawings in which like characters designate corresponding parts in all the views.

Figure 1 is a diagrammatic view of the general arrangement of the selecting and shifting mechanism relative to the steering column and the transmission gearing.

Figure 2 is a face view of the guide or indicating plate for the selecting and shifting lever.

Figure 3 is a plan view of the selecting and shifting lever and quadrant on which the guide is mounted.

Figure 4 is a sectional view on line 4—4, Figure 3, the steering column and hand wheel being shown in broken lines.

Figure 5 is a transverse sectional view through the pump operated by the hand lever during the fore-and-aft movement thereof, the adjacent portion of the steering column being also shown.

Figure 6 is a sectional view on an enlarged scale taken approximately on the line of 6—6, Figure 5.

Figure 7 is a plan view of the shifting mechanism associated with the transmission gearing, it being located in a housing constituting the cover for the gear box of the gearing.

Figure 8 is a longitudinal sectional view on line 8—8, Figure 7, the contiguous portion of the gear box being also shown, the selector being shown as having a left hand drive.

Figure 9 is a cross-sectional view through the portion of the casing for the shifting member in which the selector is located, and showing the arrangement of the selector and grooves therein relative to the shift rods for a right hand drive.

Figure 10 is a sectional view of a modified form of pump of that shown in Figure 6.

Figure 13 is a diagrammatic view of the casing showing the housing for the shifter rods and a modified form of the pressure-operated means or cylinders and pistons for effecting the throws of the shifting rods different distances, but with the fore-and-aft movement of the shifting lever uniform.

Figure 11:
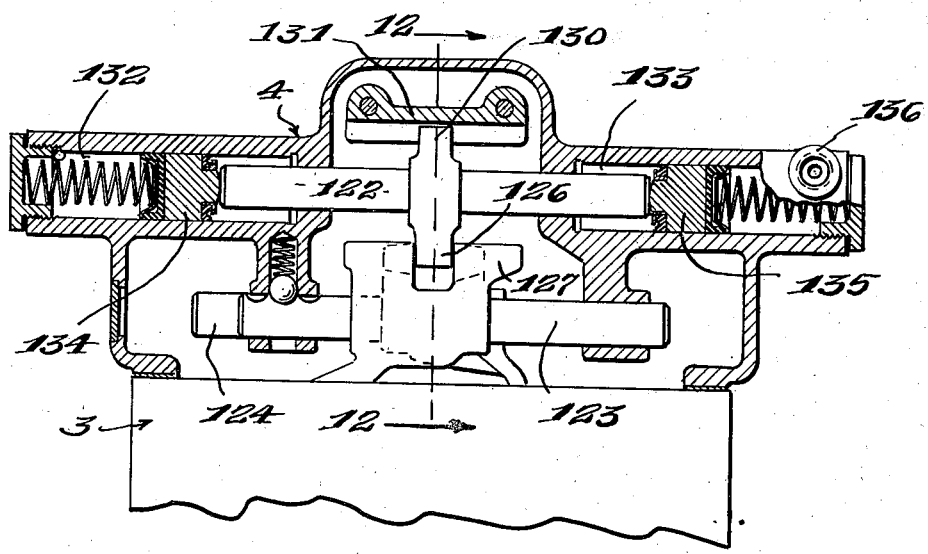
Figure 11 is a sectional view similar to Figure 8 of a modified form of shifting mechanism in which one rod is shifted by the hydraulic mechanism to effect all the shifts, instead of each of the shifting rods shifted by pressure devices, as cylinders and pistons individual thereto, as in Figures 7 and 8, the rod shifted in Figure 11 being the selector rod.

This selecting and shifting mechanism for change-speed transmission gearing includes, generally, operating mechanism for the shifters, as shift rods, including an operating or hand lever having a fore-and-aft shifting movement, and a selecting movement laterally relative to the shifting movement, motion-transmitting means between the lever and the selector, which coacts with the shifters or shift rods, to operate the selector during the selecting movement of the lever, and motion-transmitting means between the lever and the selected shifter to shift the same during the fore-and-aft movement of the lever, the latter motion-transmitting means operated by the fluid displacement and including a pump having a reversely operable member, which is actuated in one direction or the other, by the fore or aft movement of the selecting and shifting lever, and pressure-operated devices, as cylinders and pistons, which actuate the shift rod in one direction or the other, in accordance with the direction of movement of the hand lever, and conduits connecting the casing of the pump and the fluid operated devices, the conduits being connected to the pump casing on opposite sides of the movable member of the pump, so that movement in one direction, as fore, displaces the fluid in one conduit and through one pressure-operated device or one cylinder and piston, actuates the selected shift rod in one direction and movement in the other or aft direction of the movable member, when being actuated by the fore or aft movement of the shifting lever, displaces the hydraulic fluid in the other conduit and actuates the selected shift rod in the other direction. The conduits are branches of a closed system, preferably a hydraulic system, also including a reversely movable impeller or pump and pressure-operated devices. It also includes a suitable reservoir for keeping the system filled.

The hand lever is usually so arranged that its fore-and-aft shifting movement is in a general horizontal direction and its lateral selecting movement in a general vertical direction, as the shifting lever is usually mounted on the steering column of the vehicle, which column inclines forwardly and downwardly from the steering wheel.

1 designates the steering column; 2 the steering wheel. 3 designates the gear box in which the shiftable elements, gears and/or clutches are located; and 4 the housing for the shifters, this being usually the cover of the gear box. 5, 6 and 7 designate the shifters, which are here illustrated as sliding rods mounted in the housing 4, three shift rods being here shown, because the mechanism is adapted for a four speed forward and reverse transmission gearing.

8 (Figure 7) designates a selector operable by the selecting movement of the selecting and shifting lever, to select any one of the rods 5, 6 and 7 and interlock with the unselected rods to hold them from shifting movement.

10 designates the selecting and shifting lever; and 11 the pump actuated thereby during the fore-and-aft shifting movement of the lever 10. 12 and 13 designate, respectively, the conduits between the casing of the pump 11 on opposite sides of the movable member or piston of the pump and fluid-operated pressure devices, as cylinders and pistons arranged to shift the selected rod in one direction or the other, in accordance with the fore-and-aft movement of the lever 10, in its selected position, the lever 10 being moved forward from neutral position to effect certain gear shifts and rearward from neutral position to effect other gear shifts.

The lever mechanism and the pump 11 are carried near the upper and lower ends, respectively, of the steering column 1, the pump being located below the floor or in front of the dash of the vehicle.

The position of the hand lever 10 is indicated by a guide plate 14 having the usual slots 15, 16 and 17 therein. This guide plate 14 is here shown as carried at the outer edge of a bracket or quadrant 18 supported by a split clamp 19 on the steering column 1. The lever 10 is carried by a bracket 20 mounted on a hollow rock shaft 21 extending along the steering column 1 and having its upper end journalled in a suitable bearing 22 in the quadrant 18, and its lower end journalled in the casing of the pump 11, as will be presently described. The bracket 20 has a hub 23 secured to the rock shaft 21. The lever 10 is pivoted to the bracket at 24 on an axis spaced from, or eccentric to, the rock shaft 21 and is movable about this axis 24 during its selecting movement. The lever 10 has an arm 25 extending into the upper end of the hollow rock shaft 21 through a slot 26 for operating motion-transmitting means which transfers the selecting movement of the lever to the selector 8.

The motion-transmitting mechanism comprises a slide 27 in the upper end of the hollow rock shaft 21 and a Bowden wire 28 secured at one end to the slide and its other end at 29 (Figure 7) to one end of the selector 8, the Bowden wire extending lengthwise of the rock shaft 21 and out through a slot 30 (Figure 5) in the rock shaft near the floor board or the pump.

The sheathe or cable 31 of the Bowden wire is anchored by a collar or sleeve 32 within the upper end of the hollow shaft 21 below the sliding block 27 and at its other end at 33 to the casing or the cover 4 in line with the passage in which the selector 8 works. The cable or sheathing 31 of the Bowden wire is anchored in place at the shift lever end by a set screw 34 coacting with the sleeve 32; this set screw extends through the hub 23 of the bracket 20 and holds the shift lever bracket 20 in position. The cable or sheathing of the Bowden wire 28 is anchored to the housing 4 by taper nuts 35 which clamp thereon, these screwing into the end of the passage in which the selector is located. This is illustrated best in Figure 9.

The cable is adjusted to the proper length when the shift lever is in neutral position and then clamped in this position by the taper nuts 35.

The arm 25 of the lever 10 extends into a socket in the slide or block 27 and has a ball at its end coacting with the walls of the socket. Obviously, movement of the lever in one direction or the other about the pivot or axis 24 causes the slide to move up or down and shift the selector 8 through the Bowden wire 28. The fore or aft movement of the lever 10 effects the rocking of the hollow rock shaft 21 through the bracket 20, which now acts as a crank, and actuates the movable member or piston of the pump 11 to complete the gear shift, as will be presently described, the lever 10, now fulcruming at the end of the arm 25 on the block 27.

The selector 8 (Figures 7 and 9) is slidable in a suitable passage 36 in the housing or cover 4 of the gear box, this passage extending crosswise of and preferably under the rods 5, 6, 7. The selector 8 is formed with grooves 37, 38 and 39 arranged to come into alinement with the shifters or rods 5, 6, 7 and when shifted, so that one groove is in alinement with its rod, the other grooves are out of alinement with their rods, and lock the unselected rod or rods from shifting movement. The groove 37, which coacts with the shift rod 5, is alined with the groove when the lever 10 is in central or neutral position or in the position indicated in Figure 2. In this position, the lever 10 is alined with the third or fourth speed slot 15 of the guide plate 14. The shifter 8 is also formed with additional grooves 40, 41 and 42 for coacting with a spring-pressed ball or poppet 43 which locates the selector in its shifted position. The full portion 44 of the rod between the grooves 40 and 41 is higher or of greater diameter than the full portion between the grooves 40 and 42.

When the shift or selecting movement of the lever 10 into alinement with the reverse speed slot 15 of the guide 14 is made, the selector is actuated to cause the full portion 44 to ratchet past the spring-pressed poppet preliminarily to bringing the groove 41 into alinement with the poppet. Thus, a greater resistance is offered to the shifting of the selector 8 when selecting the reverse shifter rod 6, so that the operator will make a conscious effort in selecting the reverse gear. Spring-pressed poppets 48 located in bores in suitable bosses 49 on the housing or cover 4 coact with notches, as 50, in the rods to locate the rods in neutral or shifted positions.

In Figure 9, the selector, designated 8ª, is of the same construction as that shown in Figure 7, but is reversely arranged. The arrangement in Figure 7 being for a left hand drive, and that in Figure 9 is for a right hand drive, and in Figure 7, the grooves 40, 41 and 42 are located toward the end of the rod to which the Bowden wire 28 is connected, and in Figure 9, the Bowden wire is connected to the opposite end. Thus, with either of these constructions, a pull of the wire will select the same shift rods and the push on the wire will likewise shift the same shift rods, in either a right or left hand drive. This is one of the features that contribute to adapting this shift mechanism to different situations. The screw 46 closing one end of the passage 36 in which the selector is located is interchangeable with the taper nut closing the other end. The shift rods 5, 6 and 7 are formed with transverse notches 47 which, when shifted, select one of the rods, in order to lock the unselected rod from inadvertent shifting movement.

Figure 12:
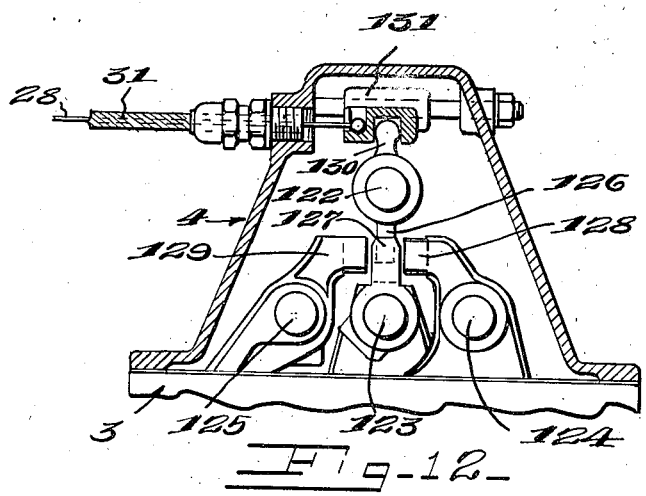
Figure 12 is a sectional view on line 12—12, Figure 11.

In Figures 11 and 12, a modified form of selector is shown, which will be hereinafter described.

The pump 11 (Figures 5 and 6) includes a suitable casing and a movable member or piston actuated by the rock shaft 21 during the fore-and-aft movement of the lever 10. This casing, as best seen in Figure 6, is supported on the steering column by a split clamp 51 and is located and held from displacement by a pin 52 extending into the space between sections of the clamp and the recess 53 in the steering column.

In the form shown in Figures 5 and 6, the casing is formed with a reservoir 54 for hydraulic liquid and with opposed piston chambers or cylinders 55, 56 which open through the ends of the body of the casing and which are closed by heads 57 and 58. The movable member of the pump is a double piston 59, the heads 60 and 61 of which work in the cylinders 55, 56 respectively. The piston is actuated from the rock shaft 21 through a rock arm 62 secured to the shaft 21 to rock therewith, and working in a transverse recess 63 in the double piston between the heads thereof, the rock arm 62 having a ball at its end coacting with the walls of the recess. The piston chambers 55 and 56 communicate with the reservoir through suitable check valves, here shown, as ball check valves 64, which permit the oil or hydraulic liquid to flow into the cylinders and the hydraulic system communicating with the cylinders, when the pistons are idle or not holding the hydraulic fluid under pressure. There is one check valve for each cylinder 55, 56 which is closed when the piston in its cylinder is actuated to apply pressure, while the other check valve remains open. Preferably the valves are connected together to work in unison so that when either valve 64 is closed by the piston in the corresponding piston chamber applying pressure to the hydraulic fluid, the other valve is positively opened and the piston chamber with which the latter valve is associated is relieved of the pressure, thus making the shifting easier and eliminating friction from fluid pressure.

In the illustrated embodiment of the invention, these valves 64, which are shown as balls, are connected together by a bar 64ª for transmitting the motion of either to the other, so that upon closing of either valve 64, the other valve is immediately opened.

The piston heads are provided with suitable cup-shaped packings 65, the lips of which are kept engaged with the walls of the cylinder by sheet metal dished washers 66 pressed into the cup by springs 67 encircling a stem 68 on the piston and thrusting at one end against the dished washer and at its other end against an abutment 69 on the stem. The piston 59 is located in its starting position by a spring-pressed poppet at 70, similar to the poppet 48, which poppet 70 coacts with the groove 71 in one of the piston heads. In Figure 10, a pump embodying an oscillating or vane piston is shown instead of a reciprocating piston, as will be presently described.

Each piston 60 and 61 is provided with ducts or ports 60ª and 61ª respectively opening through their pressure faces and also through their peripheries, the ends opening through the peripheries registering with ports 60ᵇ, 61ᵇ in the wall of the piston chambers and opening into the reservoir 54, when the pistons 60, 61 are in neutral or starting position. By this construction, the piston chambers are in communication with the reservoir 54 to permit the hydraulic fluid to enter or leave, when necessary, when the pistons are in central or neutral position, or these ducts and ports permit the piston chambers and the hydraulic system to fill up with the hydraulic fluid, if necessary, when the pistons 60 and 61 are in neutral position, so that the system is kept filled with hydraulic fluid.

The oil reservoir is formed with a filler opening closed by a plug 72 having a vent 73 opening therein for preventing the system from becoming air-bound. The rear wall 74 of the casing of the pump 11 is separable from the body of the casing and is provided with a bearing 75 in which the lower end of the rock shaft 21 is journalled and this bearing is provided with a suitable joint or seal 76 for preventing working of the oil or hydraulic liquid out of the casing of the pump 11. This removable wall 74 also permits the assembly of the rock arm with the piston and the assembly of the rock arm 62 on the rock shaft 21.

A spring for neutralizing any vibration surrounds the shaft 21 and thrusts in opposite directions against the hub of the rock arm 62 and the wall 74. The wall 74 is secured to the body of the casing of the pump, as by cap screws 77.

One form of pressure or fluid actuated device for actuating the shift rods is shown best in Figures 7 and 8. These devices are of the cylinder and piston type, and in the forms shown in Figures 7 and 8, each shift rod 5, 6 and 7 is acted on by pistons at its opposite ends working in cylinders formed in the housing or cover 4 for the gear box, one piston operating its shift rod in one direction, and the other in the opposite direction.

78, 79 and 80 designate the cylinders for like ends of rods 5, 6 and 7, and 81, 82 and 83 designate the cylinders for the other ends. 84 and 85 (Figure 8) are illustrative of the pistons in each of the cylinders, the pistons thrusting against opposite ends of the adjacent shift rods 5, 6 or 7. There is a recess or chamber 86 at the inner end of each cylinder into which the end of the shift rod extends, this recess trapping lubricating oil that may work along the shift rod, and having a drain opening 87 into the gear box. The drain opening 87 is so located as to be protected from oil entering in any manner from the gear box into the chamber 86, and hence the cylinder. Any lubricating oil from the gear box working along the shaft into the recess or chamber is free to drain out. Each piston 84 or 85 is provided with a piston cup 88 of rubber composition or other suitable material, and a stamped metal washer 90 is used to spread the lip of the piston cup to insure a good seal between the piston and the walls of the cylinder. The metal washer is perforated, so that when the fluid is under pressure, the pressure on opposite sides of the washer is equalized and additional pressure not applied to the sealing lip 89 of the piston cup 88. A suitable spring 91 interposed between the washer 90 and the head, to be described, of the piston chamber applies enough pressure to hold the lip of the piston cup against the cylinder wall. On the end of each piston, toward the end of the shift rod, is provided a seal 92. This is for the purpose of wiping the cylinder wall clean and free of lubricating oil that might work its way along the shift rod, and hence prevent the lubricating oil from fouling the cylinder walls. The piston is preferably a floating piston or free from the shifting fork.

93 and 94 designate the heads of the cylinders 78, 79, 80 and 81, 82, 83, respectively, the head 93 being common to the cylinders 78, 79 and 80, and the head 94 common to the cylinders 81, 82 and 83. In the form shown in Figures 7 and 8, the heads are formed with a chamber or channel 95 (Figure 8). The heads are secured to the ends of the cylinders in any suitable manner, as by cap screws. These heads communicate through the conduits 12, 13 with the casing of the pump 11 on opposite sides of the pump piston.

The conduits 12, 13 connect the heads 56 and 57 of the pump casing 11 or the cylinders thereof, and the recess or channel 95 of the heads 93 and 94 respectively, the conduits being connected to these parts, as by suitable couplers 98, 99 and 100, 101. Each header 93 or 94 is provided with a suitable plug or bleeder screw 102 (Figure 7) normally closing the recess or channel and having a vent passage 103 therein. The bleeder screws or plugs 102 are interchangeable with the couplings 100, 101, so that the headers 93 and 94 can be reversed for a left hand drive in the same manner that the plug 46 and the ends of the passage for the selector are interchangeable.

In operation, the system is filled with hydraulic liquid through the opening normally closed by the plug 72 of the pump casing (Figure 5). The bleeder screws or plugs 102 are loosened to permit the air to escape, and hence the hydraulic liquid to flow from the reservoir 54 past the valve 64 into the conduits 96, 97 and hence into the headers 93, 94, and fill the system, including cylinders 78, 79, 80 and 81, 82 and 83. The bleeder screws are preferably located at the highest point of the recess or channel 94, so that all the air will be expelled, and the system entirely filled with hydraulic liquid. Upon selecting movement of the lever 10, as for instance, into alinement with the slot 17 of the guide plate 14, the block 27 will be pulled upwardly and the selector 8 moved downwardly (Figure 7) bringing the groove 38 of the selector into alinement with the reverse shift rod 6, the high part 44 between the grooves 40, 41 ratcheting past the spring-pressed poppet 41. The lever 10 pivots about the axis 24 during this operation.

Now, upon movement of the lever 10 into the slot 17, the bracket 20, and hence the hollow rock shaft 21 will be rocked about the sliding block 27, as a fulcrum, this rocking the arm 62 of the pump to the left (Figure 6), forcing the piston 59 to the left, causing the piston head to displace the oil in the pipe 12 and the cylinder 55 and apply pressure in the cylinder and shift the reverse shift rod 6.

Upon movement of the lever 10 forwardly in the reverse direction in the slot 17 back into neutral position, the hollow rock shaft 21 will be rocked in the reverse direction, causing the rock arm 62 to actuate the piston 59 to the right (Figure 6) and the piston head 64 to displace the oil from the cylinder 66 in the conduit 13 and into the header 94 and cylinder 82, causing the piston 85 to shift the reverse shifter rod in the opposite direction back to neutral.

The pressure is applied in all the cylinders, but owing to the fact that the unselected shift rods are locked by the selector, only the selected one can respond to the pressure applied by the operation of the pump piston 59.

Upon shifting of the lever 10 from neutral into the slot 16 of the guide plate 14, the inner end of the arm 25 of the lever 10 is pushed downward, pushing the Bowden wire 28 to push the selector 8 so that the groove 39 is in line with the shift rod 70 and full portions of the selector 8 lock the rods 5 and 6 from shifting.

Now, upon movement forwardly of the lever along the slot 16, that is, upwardly in Figures 2 and 3, which is the fore movement of the fore-and-aft movement of the lever 10, the shaft 21 will be rocked clockwise in Figure 6, causing the rock arm 62 to move the piston 69 to the right, displacing the liquid in the cylinder 56 through the pipe 97 to the header 94 and actuate the piston in the cylinder 83 to actuate the shift rod 7 into first speed forward position, and upon movement of the lever 10 in the slot 16 back to central position, the piston 59 moves in the reverse direction or to the left (Figure 6) and displaces the oil through the pipe 12 to the header 93. Further movement along the slot 16 toward the lower end thereof (Figure 2) causes the pressure to be continued in the particular cylinder 80 and shift the rod thereof toward the right from neutral (Figure 7) to the second speed forward position. The same operation takes place when the lever is moved from central neutral position, when in alinement with the slot 15 to actuate the shift rod 5 to produce either third or fourth speeds forward. When the shift lever 10 is in central neutral position, as shown in Figure 2, it is not necessary to operate the lever 10 to select the shift rod 5 as normally when the lever 10 is in neutral position (Figure 2), the shift rod 5 is selected and the rods 6 and 7 locked from shifting movement.

During movement of the piston 59 to the left, or while the check valve 64 seats, the check valve at the opposite end opens, permitting the flow of oil from the reservoir 54 to the cylinder of the inactive piston. The reverse takes place when the piston 59 is moved to the right (Figure 6) in which case, the left hand check valve 64 opens and the right hand check valve closes.

In the form shown in Figure 7, longer throws of the lever 10 in its fore-and-aft movement is required for the different gear shifts, as illustrated by the length of the slots from the guide plate 14 (Figure 2), for instance, a longer throw is required in the slot 17 to produce reverse than in the slot 16 to produce first or second speed, and a longer throw is required in the slot 16 than in the slot 15, to produce a third and a fourth speed. In order to make the throws of the lever uniform for all speeds, the diameters of the pistons in the chambers 78, 81; 79, 82; and 80, 83 may be varied, as shown in Figure 13, wherein the piston chambers 78, 81, the companion shift rod of which effects third and fourth speeds, and hence require a short shift in the form shown in Figure 7, may be made with a piston and cylinder of larger diameter than the pistons and cylinders cooperating with shift rods requiring longer shifts (Figure 7).

In Figure 10, a pump having an oscillating vane is shown. 111 designates the vane or oscillating piston mounted on the end of the hollow rock shaft 21 and working in the piston chamber 112 which communicates with the reservoir 113 through port 114. The piston 111 works between two abutments 115 and 116 and the piston chamber communicates with the conduits 12 and 13 at the opposite sides of the piston and near the abutment 115. The piston 111 is formed with an upwardly extending radial post or arm 117 diametrically opposite to the vane 111 and carrying a spring-pressed poppet 118 which coacts with a suitable socket 119 in the wall of the cylinder to locate the vane or piston, when in central position. Also, the hub of the vane is provided with diametrically opposite recesses or vents 120, 121 which normally provide passages for the hydraulic liquid at the inner ends of the abutments 115, 116, these recesses performing a function similar to that of the check valves 64 (Figure 6), except that both are cut off or closed, upon actuation of the piston 111 in either direction from neutral.

In Figure 11, a construction is illustrated by which one set or pair of cylinders and pistons is employed to shift any one of the shift rods, instead of a pair of cylinders and pistons for each shift rod, and in the construction shown in Figures 11 and 12, the rod that is shifted is associated with the selector.

122 designates an axially shiftable selector rod slidably mounted in the cover for the gear box parallel to the shift rods 123, 124, 125, the selector rod being also movable about its axis and having a selecting finger 126 for interlocking in notches in the shifter blocks 127, 128 and 129 on the shift rods respectively. The selector rod also has a finger 130 extending into a groove in an actuator 131, the groove being long enough to receive the finger 130 in any shifted position of the rod 122. The actuator 131 is connected to the Bowden wire 28. The rod 122 extends at its opposite ends into the cylinders 132 and 133 in which work pistons 134 and 135, similar in construction and arrangement to the pistons and cylinders shown in Figure 8. The cylinders 132 and 133 are connected at their ends through suitable couplings as 136 to the pipes or conduits 12, 13 leading from the pump. The selecting finger 126 is normally engaged with the notch of the block of the intermediate rod 123 which controls third and fourth speeds forward and hence, upon operation of the lever 10 in the fore or aft direction from neutral, the pressure will be transferred by the pump through the pipe 12 or 13 to the cylinder 132 or 133 and actuate the piston therein to shift the rod 123.

Selecting movement of the gear shifting lever in one direction or the other will cause the rod 122 to be locked to select the block 129 of the shift rod 125 or the block 128 of the shift rod 124 and then upon the fore or aft movement, the selected shift rod will be actuated by the pressure in the cylinder 132 or 133 against the piston 134 or 135. Hence, in this construction shown in Figure 11, but a pair of cylinders is employed to actuate a plural number of shift rods. No positive lock provision need be made to hold the unselected rods from movement, aside from the spring-pressed poppets, because the unselected shift rods therein resist any pressure, as in the construction shown in Figure 7, when the selected rod is being shifted.

What we claim is:

1. The combination with the shifters and selector of a selective change-speed transmission gearing, a housing for the shifters and the selector, the shifters being shift rods and the housing being formed with pressure chambers in which the ends of the rods work, pistons slidable in said chambers, and coacting with the rods to shift the same, a header common to the piston chambers at like ends of the rod, a selecting and shifting lever having a selecting movement to operate the selector and a shifting movement, a pump including a reversely-movable member operable to supply hydraulic liquid to the headers in accordance with the direction of movement of the movable pump member, and means operated by the lever during the shifting movement for operating the movable pump member in one direction or the other.

2. The combination with a shifting and selecting mechanism of a selective change-speed transmission gearing, said mechanism including a plurality of shift rods; of pressure-operated devices for operating the shift rods including a pair of cylinders and pistons operating in opposite directions on opposite ends of each shift rod, a header common to all the cylinders at like ends of the shift rods, a closed hydraulic system including branches connected respectively to the headers, and means for selecting the shift rod to be shifted and locking the other shift rods from movement and for shifting the selected rod including a lever having a selecting and shifting movement, connections operated thereby during the selecting movement to select a predetermined shift rod, and means operated by the lever during the shifting movement to apply pressure through one or the other of said branches.

3. The combination with the shifters and selector of a selective change speed transmission gearing, a housing for the shifters and the selector, the selector operating to lock the unselected shifters from movement, the shifters being shift rods and the housing being formed with pressure chambers in which the ends of the rods work, pistons slidable in said chambers and coacting with the shift rods to shift the same, a header common to the piston chambers at like ends of the rods, a selecting and shifting lever having a selecting movement to operate the selector and a shifting movement, a pump including a reversely movable member operable to supply hydraulic liquid to one or the other of the headers in accordance with the direction of the movement of the movable pump member, and means operated by the lever during the shifting movement for operating the movable pump member in one direction or the other, and means operated by the lever during its selecting movement to operate the selector to select one shift rod and lock the others from movement.

CARL D. PETERSON.
ROBERT R. BURKHALTER.
ELMER J. BARTH.